United States Patent
Jeon

(10) Patent No.: US 10,505,377 B2
(45) Date of Patent: Dec. 10, 2019

(54) BATTERY MANAGEMENT APPARATUS AND SYSTEM

(71) Applicant: SAMSUNG ELECTRONICS CO., LTD., Suwon-si (KR)

(72) Inventor: Jinyong Jeon, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 230 days.

(21) Appl. No.: 15/448,291

(22) Filed: Mar. 2, 2017

(65) Prior Publication Data
US 2018/0062403 A1    Mar. 1, 2018

(30) Foreign Application Priority Data
Aug. 24, 2016  (KR) .................. 10-2016-0107803

(51) Int. Cl.
*H02J 7/00* (2006.01)
(52) U.S. Cl.
CPC .......... *H02J 7/0021* (2013.01); *Y02T 10/7055* (2013.01)
(58) Field of Classification Search
CPC .................................................... H02J 7/0021
See application file for complete search history.

(56) References Cited

U.S. PATENT DOCUMENTS

| | | | |
|---|---|---|---|
| 7,804,275 B2 | 9/2010 | Dellacona | |
| 8,201,008 B2 | 6/2012 | Park | |
| 8,718,848 B2 | 5/2014 | Pfefferl et al. | |
| 9,000,728 B2 | 4/2015 | Kamiya | |
| 2008/0086247 A1* | 4/2008 | Gu | H02J 7/0022 701/36 |
| 2011/0241921 A1 | 10/2011 | Wu | |
| 2014/0377602 A1 | 12/2014 | Thoelmann | |
| 2017/0087998 A1* | 3/2017 | Minamii | B60L 11/1811 |

FOREIGN PATENT DOCUMENTS

| | | |
|---|---|---|
| JP | 2010-283918 A | 12/2010 |
| KR | 10-0207122 B1 | 7/1999 |
| KR | 20-0365244 Y1 | 10/2004 |
| KR | 10-0540083 B1 | 1/2006 |
| KR | 10-2010-0089278 A | 8/2010 |
| KR | 10-2013-0045600 A | 5/2013 |
| KR | 10-2015-0011283 A | 1/2015 |
| KR | 10-2015-0069899 A | 6/2015 |

* cited by examiner

*Primary Examiner* — Richard V Muralidar
(74) *Attorney, Agent, or Firm* — NSIP Law

(57) ABSTRACT

A slave battery management apparatus includes a sensor configured to sense a physical quantity of a battery; a voltage converter configured to receive an output physical quantity from the battery, to convert the output physical quantity into an operating physical quantity corresponding to a physical quantity to operate a controller, and to output the operating physical quantity to the controller; and a controller configured to use the operating physical quantity as an operating power and to transmit battery data by using the operating physical quantity, wherein the battery data is generated based on the sensed physical quantity.

20 Claims, 8 Drawing Sheets

BATTERY MANAGEMENT APPARATUS AND SYSTEM

CROSS-REFERENCE TO RELATED APPLICATION(S)

This application claims the benefit under 35 USC § 119(a) of Korean Patent Application No. 10-2016-0107803 filed on Aug. 24, 2016, in the Korean Intellectual Property Office, the entire disclosure of which is incorporated herein by reference for all purposes.

BACKGROUND

1. Field

The following description relates to a battery management apparatus and system

2. Description of Related Art

A battery pack operating an electric load, for example, a motor may include a plurality of batteries. The plurality of batteries may be connected in series.

To measure a voltage and a temperature of the plurality of batteries, a plurality of battery management apparatuses may be connected to the plurality of batteries, respectively. A power source of the plurality of battery management apparatuses is generally an external power source, for example, a separate and distinct 12 volt (V)-battery. In this example, each of the plurality of battery management apparatuses may require a wire harness to receive a power from their respectively corresponding external power source. Also, because the external power source supplies a power to another electronic device, a change in load of the other electronic device may affect the external power source. Accordingly, the change in load may also affect each of the plurality of battery management apparatuses receiving the power from the external power source.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According to a general aspect, a slave battery management apparatus includes a sensor configured to sense a physical quantity of a battery; a voltage converter configured to receive an output physical quantity from the battery, to convert the output physical quantity into an operating physical quantity corresponding to a physical quantity to operate a controller, and to output the operating physical quantity to the controller; and a controller configured to use the operating physical quantity as an operating power and to transmit battery data by using the operating physical quantity, wherein the battery data is generated based on the sensed physical quantity.

The voltage converter may include a filter configured to filter an output voltage of the battery; a first converter configured to convert the filtered output voltage into a direct current (DC) voltage; a smoother configured to remove a ripple component from the DC voltage; and a second converter configured to adjust a magnitude of a ripple-free DC voltage obtained by removing the ripple component from the DC voltage.

The second converter may be further configured to step up the ripple-free DC voltage in response to an operating voltage of the controller being greater than or equal to an output voltage of the battery, and to step down the ripple-free DC voltage in response to the operating voltage being less than the output voltage.

The voltage converter may further include an insulator configured to electrically insulate the battery from the controller.

The battery data may include first physical quantity data corresponding to the sensed physical quantity, and the controller may be further configured to transmit the first physical quantity data to a master battery management apparatus, to receive a first control signal defined based on a result of comparison between first state information of the battery and a reference value from the master battery management apparatus, and to enter a sleep mode based on the first control signal, the first state information being determined based on the first physical quantity data.

The slave battery management apparatus may be further configured to perform a sensing operation and a voltage conversion operation of the voltage converter and prevented from performing other operations in the sleep mode.

In response to the battery being charged, the battery data may include second physical quantity data corresponding to a sensed physical quantity of the charged battery, and the controller may be further configured to transmit the second physical quantity data to the master battery management apparatus, to receive a second control signal from the master battery management apparatus in response to second state information that is determined based on the second physical quantity data being greater than the reference value, and to shift an operation mode from the sleep mode to a normal mode based on the second control signal.

The reference value may be determined based on an operating time during which the slave battery management apparatus operates using an amount of charge remaining in the battery.

The slave battery management apparatus may further include a DC-to-DC (DC/DC) converter configured to convert an output voltage of the battery into a voltage to be output to a load, wherein the battery data comprises state information determined based on the sensed physical quantity, and the controller may be further configured to control the DC/DC converter using a control value corresponding to the state information.

The voltage converter may be further configured to convert the output physical quantity of the battery into the operating physical quantity in lieu of receiving a voltage from an external power source, and to output the operating physical quantity to the controller.

According to another general aspect, a battery management system includes a master battery management apparatus; and at least one slave battery management apparatus configured to communicate with the master battery management apparatus, the slave battery management apparatus including a controller; a sensor configured to sense a physical quantity of a battery; and, a voltage converter configured to receive an output physical quantity from the battery, to convert the output physical quantity into an operating physical quantity corresponding to a physical quantity to operate the controller, and to output the operating physical quantity to the controller, wherein the controller is configured to use the operating physical quantity as an operating power and transmit battery data to the master battery management apparatus by using the operating physical quantity, the battery data being generated based on the sensed physical quantity.

The voltage converter may include a filter configured to filter an output voltage of the battery; a first converter configured to convert the filtered output voltage into a direct current (DC) voltage; a smoother configured to remove a ripple component from the DC voltage; and a second converter configured to adjust a magnitude of a ripple-free DC voltage obtained by removing the ripple component from the DC voltage.

The second converter may be further configured to step up the ripple-free DC voltage in response to an operating voltage of the controller being greater than or equal to an output voltage of the battery, and step down the ripple-free DC voltage in response to the required voltage being less than the output voltage.

The battery data may include first physical quantity data corresponding to the sensed physical quantity, the controller may be further configured to transmit the first physical quantity data to the master battery management apparatus, to receive a first control signal from the master battery management apparatus, and to enter a sleep mode based on the first control signal, and the master battery management apparatus may be configured to determine first state information of the battery based on the first physical quantity date, to define the first control signal based on a result of comparison between the first state information of the battery and a reference value, and to transmit the first control signal to the controller.

In response to the battery being charged, the battery data may include second physical quantity data corresponding to a sensed physical quantity of the charged battery, the controller may be further configured to transmit the second physical quantity data to the master battery management apparatus, to receive a second control signal from the master battery management apparatus, and to shift an operation mode from the sleep mode to a normal mode based on the second control signal, and the master battery management apparatus is further configured to determine second state information based on the second physical quantity data, to define the second control signal in response the second state information being greater than the reference value, and to transmit the second control signal to the controller.

The reference value may be determined based on an operating time during which the slave battery management apparatus operates using an amount of charge remaining in the battery.

The slave battery management apparatus may further include a DC-to-DC (DC/DC) converter configured to convert an output voltage of the battery into a voltage to be output to a load, the battery data may include state information determined based on the sensed physical quantity, and the controller may be further configured to control the DC/DC converter using a control value corresponding to the state information.

The controller may be further configured to transmit the state information to the master battery management apparatus, and the master battery management apparatus may be configured to determine the control value to correspond to the state information based on a physical quantity of the load and to transmit the control value to the controller.

According to another general aspect, an operation method of a slave battery management apparatus includes receiving an output physical quantity of a battery; converting the output physical quantity into an operating physical quantity corresponding to a physical quantity to operate a controller; and actuating the controller to transmit battery data by using the operating physical quantity as an operating power, wherein the battery data is generated based on sensed physical quantity of the battery.

Other features and aspects will be apparent from the following detailed description, the drawings, and the claims.

Figure 1:
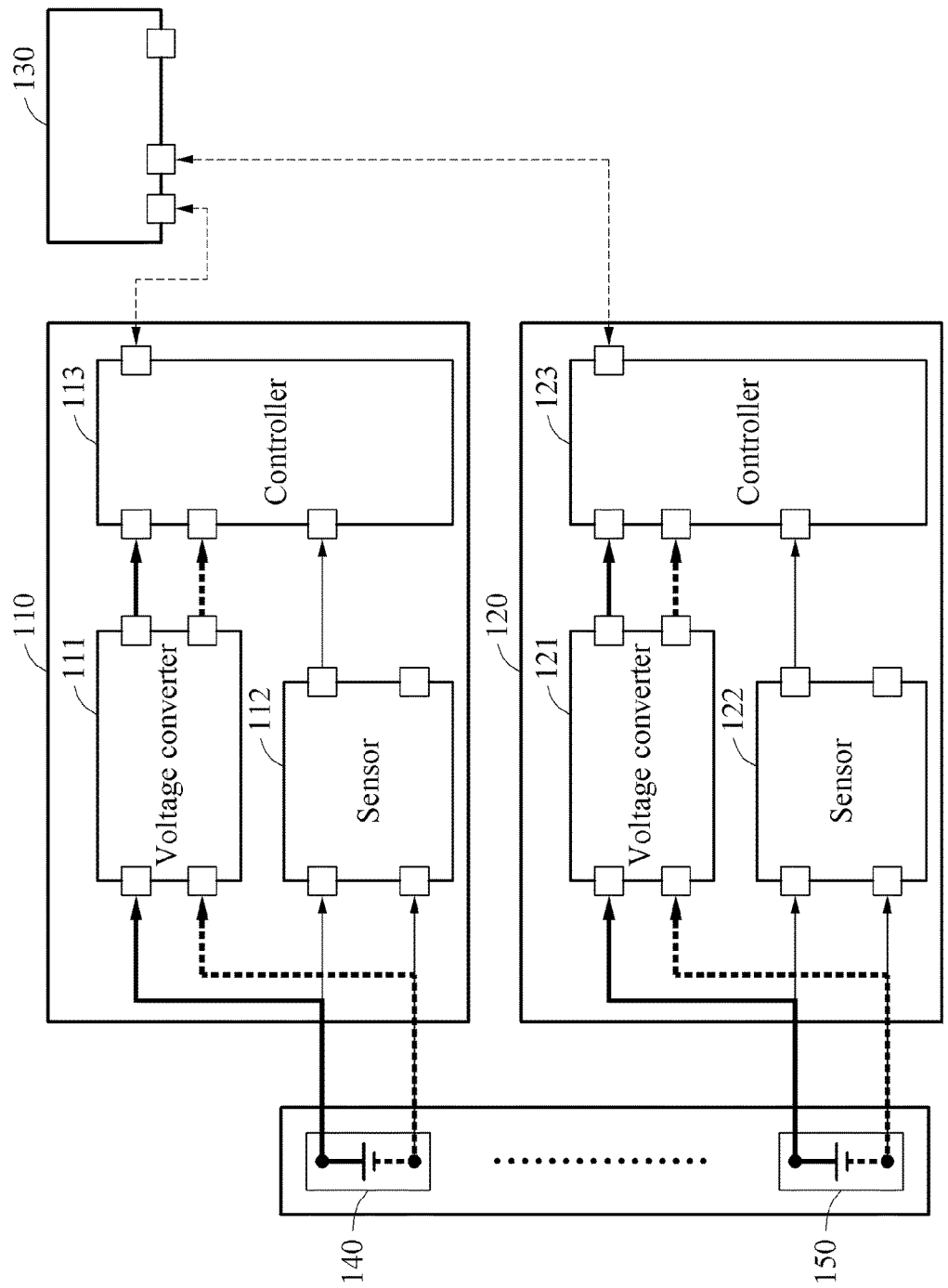
FIG. 1 illustrates an example of a slave battery management apparatus and a master battery management apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after gaining a thorough understanding of the disclosure of this application to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after gaining an understanding of the disclosure of this application.

Hereinafter, reference will now be made in detail to examples with reference to the accompanying drawings, wherein like reference numerals refer to like elements throughout.

Various alterations and modifications may be made to the examples. Here, the examples are not construed as limited to the disclosure and should be understood to include all changes, equivalents, and replacements within the idea and the technical scope of the disclosure.

The terminology used herein is for the purpose of describing particular examples only and is not to be limiting of the examples. As used herein, the singular forms "a", "an", and "the" are intended to include the plural forms as well, unless the context clearly indicates otherwise. It will be further understood that the terms "include/comprise" and/or "have" when used in this specification, specify the presence of stated features, integers, steps, operations, elements, components, and/or combinations thereof, but do not preclude the presence or addition of one or more other features, numbers, steps, operations, elements, components, and/or groups thereof.

Unless otherwise defined, all terms including technical and scientific terms used herein have the same meaning as commonly understood by one of ordinary skill in the art to which examples belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the examples with reference to the accompanying drawings, like reference numerals refer to like constituent elements and a repeated description related thereto will be omitted. When it is determined that detailed description related to a known function or configuration which would be likely to make the purpose of the examples unnecessarily ambiguous in describing the examples, the detailed description will be omitted here for clarity and conciseness.

FIG. 1 illustrates an example of a slave battery management apparatus and a master battery management apparatus.

Referring to FIG. 1, a battery management system includes a plurality of slave battery management apparatuses 110 and 120 and a master battery management apparatus 130.

The slave battery management apparatus 110 includes a voltage converter 111, a sensor 112, and a controller 113. The slave battery management apparatus 110 monitors or controls a respective battery 140 from which the slave battery management apparatus 110 draws its own operating power.

The slave battery management apparatus 120 includes a voltage converter 121, a sensor 122, and a controller 123. The slave battery management apparatus 120 monitors or controls a battery 150 from which it also draws its own operating power. The battery 150 is connected to the battery 140 in series. Other configurations of the batteries are possible. For example, one or more of the batteries may be connected in series, in parallel, combinations of the two, or in a reconfigurable array according to power needs.

Hereinafter, descriptions of a slave battery management apparatus, according to one or more embodiments, will be provided based on the slave battery management apparatus 110. The following descriptions will be also applicable to the slave battery management apparatus 120.

The voltage converter 111 is electrically connected to the battery 140 and receives an output physical quantity (such as a voltage, current, or other operational characteristic or parameter) of the battery 140 from the battery 140. The voltage converter 111 converts the output physical quantity of the battery 140 into an operating physical quantity corresponding to a required physical quantity of the controller 113 (such as a suitable voltage for operation of the slave battery management apparatus 110 inclusive of the controller 113). The operating physical quantity indicates, for example, an electrical physical quantity required to operate or drive the controller 113. The voltage converter 111 converts an output voltage of the battery 140 to correspond substantially to a required, suitable, or effective voltage to operate the controller 113 and outputs the converted output voltage to the controller 113. For example, when the output voltage of the battery 140 is 2.3 volts (V) and the required voltage of the controller 113 is 5 V direct current (DC) voltage, the voltage converter 111 converts the output voltage to substantially correspond to 5 V DC voltage. An example of the voltage converter 111 will be described with reference to FIG. 2.

The controller 113 uses the operating physical quantity as an operating power. For example, the output voltage of the battery 140 is converted to correspond to the required voltage and thus, the controller 113 uses the converted output voltage as the operating power. In other words, a power supply source of the controller 113 is not an external power source, for example, a separate 12V-battery or a power supply but the same battery 140 that is being monitored by the slave battery management apparatus 110. This may be seen as counterintuitive because traditionally, the load introduced by the sensor, converter, controller, according to conventional approaches would result in an inaccurate reading of the battery 140. For this reason, conventional battery management apparatuses required use of a separate power source from the battery being managed.

The slave battery management apparatus 110 uses the operating physical quantity into which the output physical quantity of the battery 140 as the operating power in lieu, or instead, of a physical quantity supplied from an external power source to perform a plurality of operations. For example, the slave battery management apparatus 110 performs a sensing operation, an operation of processing a sensed physical quantity, and a communicating operation. In this example, the sensor 112 senses a physical quantity of the battery 140. The sensor 112 includes, for example, a voltage sensor, a current sensor, a temperature sensor, or combinations thereof. A sensor included in the sensor 112 is not limited to the aforementioned sensors but may include one or combinations of two or more. The physical quantity of the battery 140 includes any one of a voltage, a current, a temperature, a resistance, and an impedance of the battery 140 or combinations thereof. Here, the voltage of the battery 140 indicates an output voltage of the battery 140 and the current of the battery 140 indicates an output current of the battery 140.

The controller 113 receives the sensed physical quantity from the sensor 112 and generates operational battery data based on the sensed physical quantity. For example, physical quantity data including voltage data, current data, and temperature data of the battery 150 is generated.

The slave battery management apparatus 110 performs a communicating operation. The controller 113 transmits the battery data to, for example, the master battery management apparatus 130 or another suitable device. For example, the controller 113 transmits (via wired or wireless communication measures) the battery data to the master battery management apparatus 130 through controller area network (CAN) communication. The aforementioned communication of the controller 113 is merely an example and thus, a type of communication of the controller 113 is not limited thereto.

As discussed above, the operating power used in the communicating operation may be the operating physical quantity into which the output physical quantity of the battery 140 is converted.

The master battery management apparatus 130 receives the battery data from the controller 113. For example, the master battery management apparatus 130 receives the physical quantity data from the controller 113. The master battery management apparatus 130 determines state information of the battery 140 based on the physical quantity data. The master battery management apparatus 130 calculates a state of charge (SOC) and/or a state of health (SOH) of the battery 140 based on the physical quantity data and determines the SOC or the SOH to be the state information of the battery 140. Also, the master battery management apparatus 130 determines a result obtained by multiplying the SOC by the SOH to be the state information.

The master battery management apparatus 130 manages power of each of the plurality of slave battery management apparatuses 110 and 120. The master battery management apparatus 130 compares the state information of the battery 140 to a reference value. The reference value is determined based on, for example, information on a period of time during which the slave battery management apparatus 110 is operable using an amount of charge remaining in the battery 140. Hereinafter, an amount of charge remaining in a battery is also referred to as a remaining capacity. As a comparison result, when the state information of the battery 140 is less than or equal to the reference value, the master battery management apparatus 130 defines a first control signal indicating, for example, "wake up =off". The master battery management apparatus 130 transmits the first control signal to the slave battery management apparatus 110. The controller 113 changes an operation mode of the slave battery management apparatus 110 based on the first control signal. Here, the operation mode includes a normal mode and a sleep mode. The slave battery management apparatus 110 operating in the normal mode enters the sleep mode.

When the slave battery management apparatus 110 enters the sleep mode, the sensing operation and a voltage conversion operation of the voltage converter 111 among the plurality of operations of the slave battery management apparatus 110 may be performed and remaining operations may not be performed. For example, in the sleep mode, the communicating operation is not performed. In the sleep mode, the controller 113 uses the operating physical quantity as the operating power, generates the physical quantity data by processing the sensed physical quantity, and does not transmit the physical quantity data to the master battery management apparatus 130. The aforementioned operations of the slave battery management apparatus 110 in the sleep mode are merely an example and thus, an operation of slave battery management apparatus 110 in the sleep mode is not limited to the example. In the sleep mode, the slave battery management apparatus 110 operates using a significantly reduced and substantially minimal amount of power.

While the slave battery management apparatus 110 is in the sleep mode, the battery 140 is charged. In this example, a voltage of the battery 140 is increased or a current flowing into the battery 140 accumulates. The sensor 112 senses a physical quantity of the battery 140 in a charged state, and transmits the sensed physical quantity to the controller 113. The controller 113 generates physical quantity data based on the sensed physical quantity. When compared to the physical quantity data in an uncharged state, the physical quantity data is changed due to the charging of the battery 140. For example, a value of voltage and/or a value of current increases. In this example, although the controller 113 is in the sleep mode, the controller 113 may activate the communicating operation temporarily by using the operating physical quantity as the operating power, and transmits the physical quantity data acquired during the charging to the master battery management apparatus 130. When the slave battery management apparatus 110 is in the sleep mode, and when the physical quantity data changes due to the charging of the battery 140, the controller 113 may activate the communicating operation temporarily, and transmits the physical quantity data to the master battery management apparatus 130.

The master battery management apparatus 130 determines the state information of the battery 140 based on the physical quantity data acquired during the charging. The master battery management apparatus 130 compares the state information to the reference value. As a comparison result, when the state information is greater than the reference value, the master battery management apparatus 130 defines a second control signal indicating, for example, "wake up =on". The master battery management apparatus 130 transmits the second control signal to the slave battery management apparatus 110. The controller 113 changes the operation state of the slave battery management apparatus 110 based on the second control signal. Thereafter, the slave battery management apparatus 110 enters the normal mode. In the normal mode, the slave battery management apparatus 110 performs a plurality of operations.

The slave battery management apparatus 110 receives its own operating power from the sensing target battery (in lieu of an external power source) and thus, the external power source and a wire harness for power supply are omitted while retaining the ability to operate the slave battery management apparatus and a reasonable level of accuracy in measurements, which, amongst other features significantly reduces a weight and complexity of such a battery management system. Also, the slave battery management apparatus 110 is able to avoid being affected by a change in a load of another electronic device operating using power supplied from the external power source.

Figure 2:
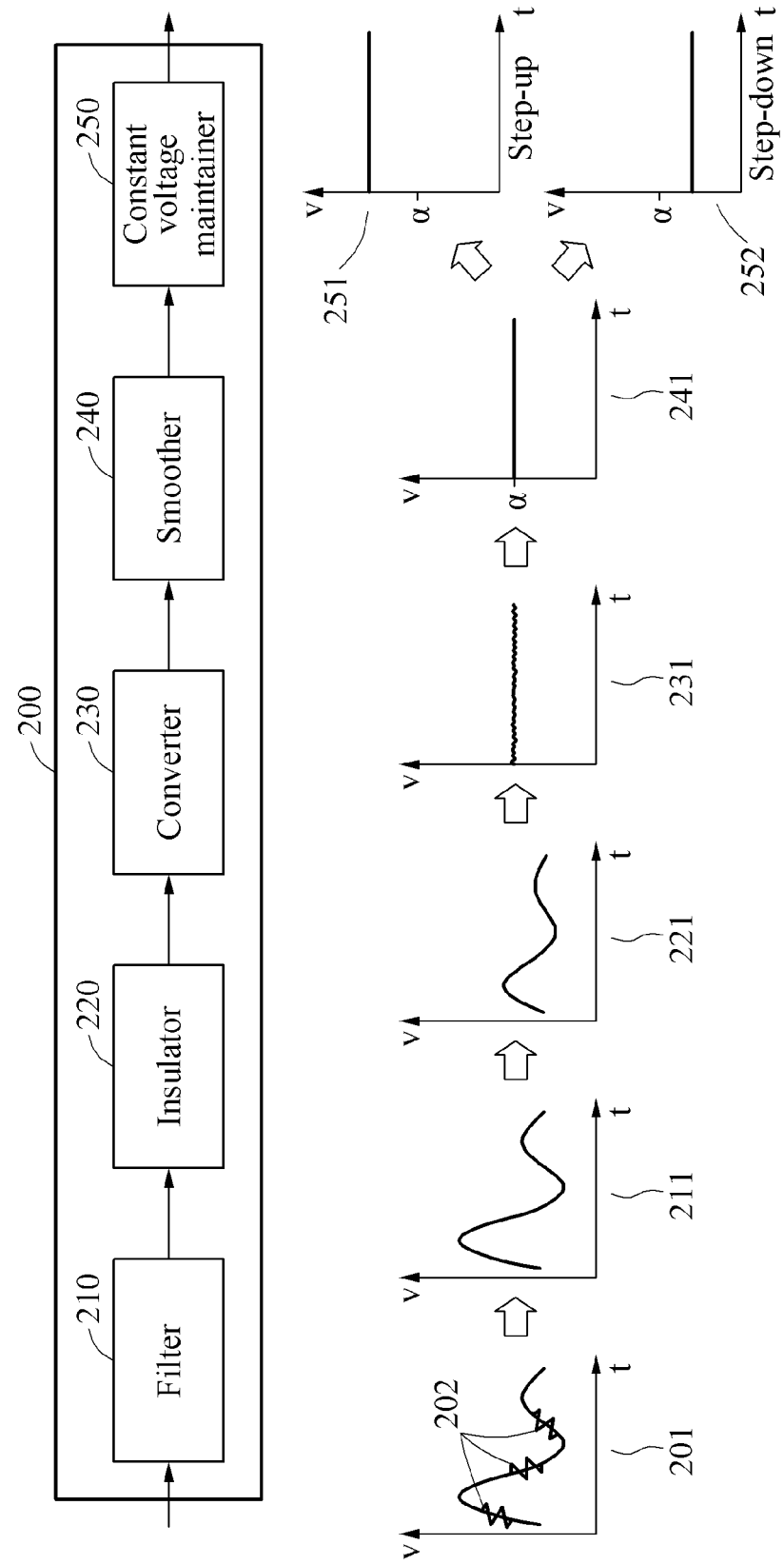
FIG. 2 illustrates an example of a voltage converter.

FIG. 2 illustrates an example of a voltage converter.

Referring to FIG. 2, a voltage converter 200 includes a filter 210, an insulator 220, a converter 230, a smoother 240, and a constant voltage maintainer 250 employing electrical components as would be known to one of skill in the art after gaining a thorough understanding of the detailed description.

An output physical quantity of a battery is supplied to the voltage converter 200. The output physical quantity is also referred to as, for example, an output voltage.

The output voltage is input to the filter 210. The output voltage of the battery vertically swings based on a charging and discharging current pattern of the battery. As indicated by a waveform 201, the output voltage is not constant and swings vertically. Also, due to an operation of a load, for example, a motor of the battery, the output voltage includes high-frequency noise 202. In the waveform 201, the high-frequency noise 202 appears in the output voltage of the battery. The filter, according to one or more embodiments, employs one or more capacitors, resistors, bulk acoustic wave resonators or inductors. For example, the filter may be a low-pass or band-pass filter employing resistor and capacitor.

The filter 210 filters the output voltage of the battery. Through filtering, the high-frequency noise 202 is removed from the output voltage. As shown in a waveform 211, the high-frequency noise 202 is removed.

The filtered output voltage is input or transferred to the insulator 220. The insulator 220 is configured to electrically insulate the battery from a controller in a slave battery management apparatus. As shown in a waveform 221, a voltage having passed through the insulator 220 decreases.

The voltage having passed through the insulator 220 is input or transferred to the converter 230. The converter 230 converts the vertically swinging voltage into a DC voltage.

The converter 230 is, for example, an alternating current to direct current (AC/DC) converter such as a rectifier employing a plurality of diodes interconnected in a bridge circuit. A waveform 231 represents the DC voltage. In this example, the DC voltage includes a ripple component.

The DC voltage is input or transferred to the smoother 240. The smoother 240 removes the ripple component from the DC voltage. The smoother 240 is, for example, a smoothing circuit including a capacitor. A waveform 241 represents a DC voltage obtained by removing the ripple component, for example, a substantially ripple-free DC voltage.

The substantially ripple-free DC voltage is input or transferred to the constant voltage maintainer 250. The constant voltage maintainer 250, such as a voltage source, adjusts a magnitude of the ripple-free DC voltage. For example, when the output voltage of the battery is less than the required voltage of the controller, the constant voltage maintainer 250 steps up the DC voltage. A waveform 251 represents a stepped-up DC voltage. When the output voltage of the battery is greater than or equal to the required voltage of the controller, the constant voltage maintainer 250 steps down the DC voltage. A waveform 252 represents a stepped-down DC voltage.

The constant voltage maintainer 250 is, for example, a DC-to-DC (DC/DC) converter, a voltage regulator, or a DC regulated circuit. In one example, a capacitor is provided at an input end of the DC/DC converter, the voltage regulator, or the DC regulated circuit to remove a ripple component. The capacitor transfers a ripple-free DC voltage to the DC/DC converter, the voltage regulator, or the DC regulated circuit.

The stepped-up DC voltage or the stepped-down DC voltage is supplied to the controller, and the controller uses the stepped-up DC voltage or the stepped-down DC voltage as the operating power from the same battery under management without an additional external power supply.

Figure 3:
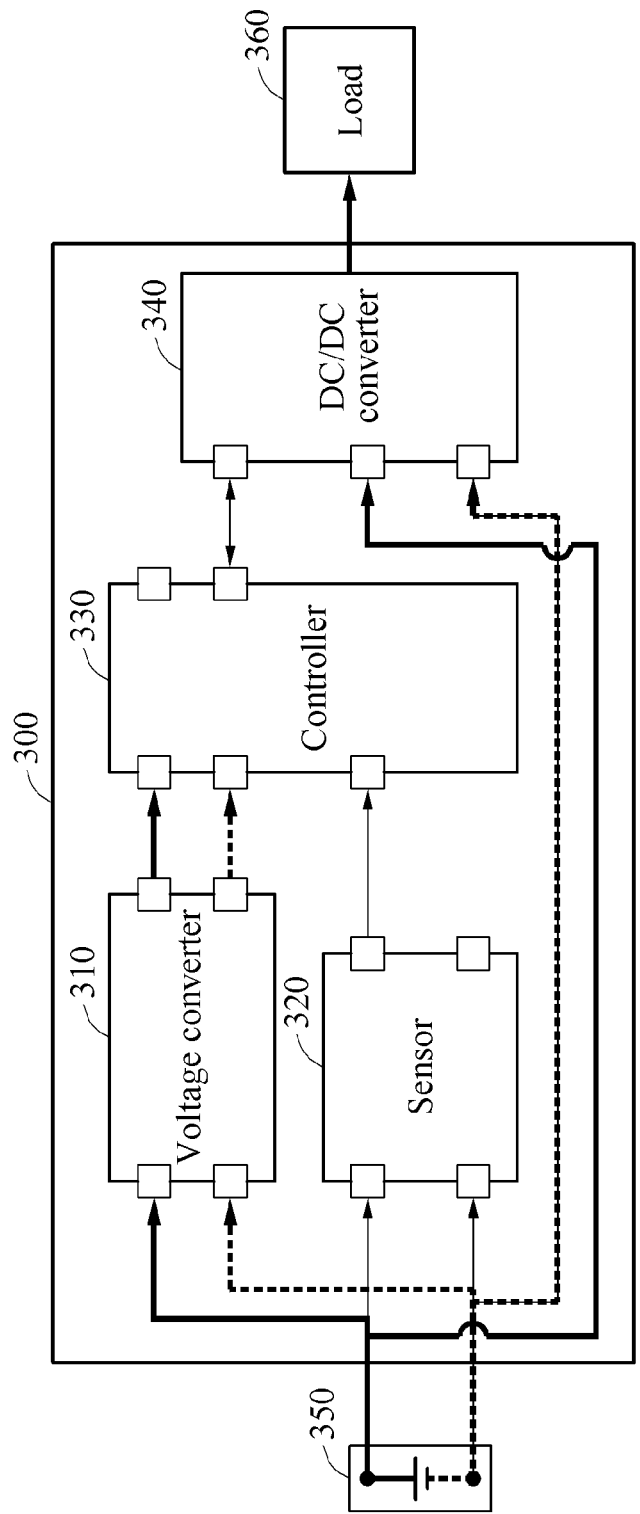
FIG. 3 illustrates an example of a slave battery management apparatus.

FIG. 3 illustrates an example of a slave battery management apparatus.

Referring to FIG. 3, a slave battery management apparatus 300 includes a voltage converter 310, a sensor 320, a controller 330, and a DC/DC converter 340.

The voltage converter 310 is electrically connected to a battery 350 and receives an output physical quantity from the battery 350. The voltage converter 310 converts the output physical quantity of the battery 350 into an operating physical quantity of the controller 330. As discussed above, the voltage converter 310 converts the output physical quantity of the battery 350 to correspond to a required physical quantity of the controller 330. Because the descriptions of FIGS. 1 and 2 are also applicable here, repeated descriptions with respect to the voltage converter 310 will be omitted for clarity and conciseness.

The sensor 320 senses a physical quantity of the battery 350. Since the descriptions of FIG. 1 are also applicable here, repeated descriptions with respect to the sensor 320 will be omitted.

The controller 330 uses the physical quantity supplied from the voltage converter 310 as an operating power. The controller 330 uses, as the operating voltage, a voltage into which the output voltage of the battery 350 corresponding to the sensing target battery is converted, in lieu of a voltage supplied from an external power source. Thus, the slave battery management apparatus 300 both measures and operates based solely on the battery 350.

The slave battery management apparatus 300 performs a plurality of operations using the operating physical quantity as the operating power. While the operating physical quantity is used as the operating power, the controller 220 generates battery data by processing a sensed physical quantity and transmits the battery data to a master battery management apparatus (as seen in FIG. 1). The controller 330 generates physical quantity data, for example, voltage data, current data, and temperature data from the sensed physical quantity, and determines state information of the battery 350 based on the physical quantity data. The battery data includes the state information. The state information determined by the controller 330 is also be referred to as, for example, state information_1. The controller 330 transmits the state information_1 to the master battery management apparatus.

The master battery management apparatus receives the state information_1 from the slave battery management apparatus 300. Also, the master battery management apparatus receives state information_n from another slave battery management apparatus (such as seen in FIG. 1).

The master battery management apparatus receives state information from each of a plurality of state battery management apparatuses and determines pack state information of a battery pack including a plurality of batteries based on the received state information. For example, the master battery management apparatus receives state information, for example State of Charge: SOC_1 to SOC_n from the plurality n of slave battery management apparatuses and determines an average SOC of the state information SOC_1 to SOC_n to be the pack state information. The master battery management apparatus receives state information State of Health SOH_1 to SOH_n from the plurality n of slave battery management apparatuses and determines an average SOH of the state information SOH_1 to SOH_n to be the pack state information. The master battery management apparatus also determines a result obtained by multiplying the average SOC by the average SOH to be the pack state information. Since each of the slave battery management apparatuses determines state information of a corresponding battery, the master battery management apparatus may not calculate the state information for each of the batteries. Accordingly, an operation amount of the master battery management apparatus is significantly reduced.

The master battery management apparatus transmits the pack state information and/or the state information of each of the plurality of batteries to an electronic control unit (ECU). The ECU outputs either one or both of the pack state information and/or the state information of each of the plurality of batteries to a display such as a dashboard.

The master battery management apparatus determines a control value to control the DC/DC converter 340. For example, the master battery management apparatus determines a control value corresponding to the state information based on a required physical quantity of a load 360. A procedure of determining a control value in the master battery management apparatus is further described with reference to FIG. 4.

The master battery management apparatus transmits the control value to the slave battery management apparatus 300. The controller 330 controls the DC/DC converter 340 based on the control value. The DC/DC converter 340 converts an electrical physical quantity, for example, a voltage, a current, and/or a power of the battery 350 into an electrical physical quantity to be used by the load 360. The load 360 includes a low-voltage load or a high-voltage load. The low-voltage load includes a system operable at a low voltage, for example, 12 V such as a posture control system or a temperature control system of an electric vehicle. The high-voltage load includes, for example, a charger including an onboard charger or an inverter of the electric vehicle. When the battery 350 supplies power to the low-voltage load, the DC/DC converter 340 converts the output voltage of the battery 350 into an operating voltage of the low-voltage load.

Figure 4:
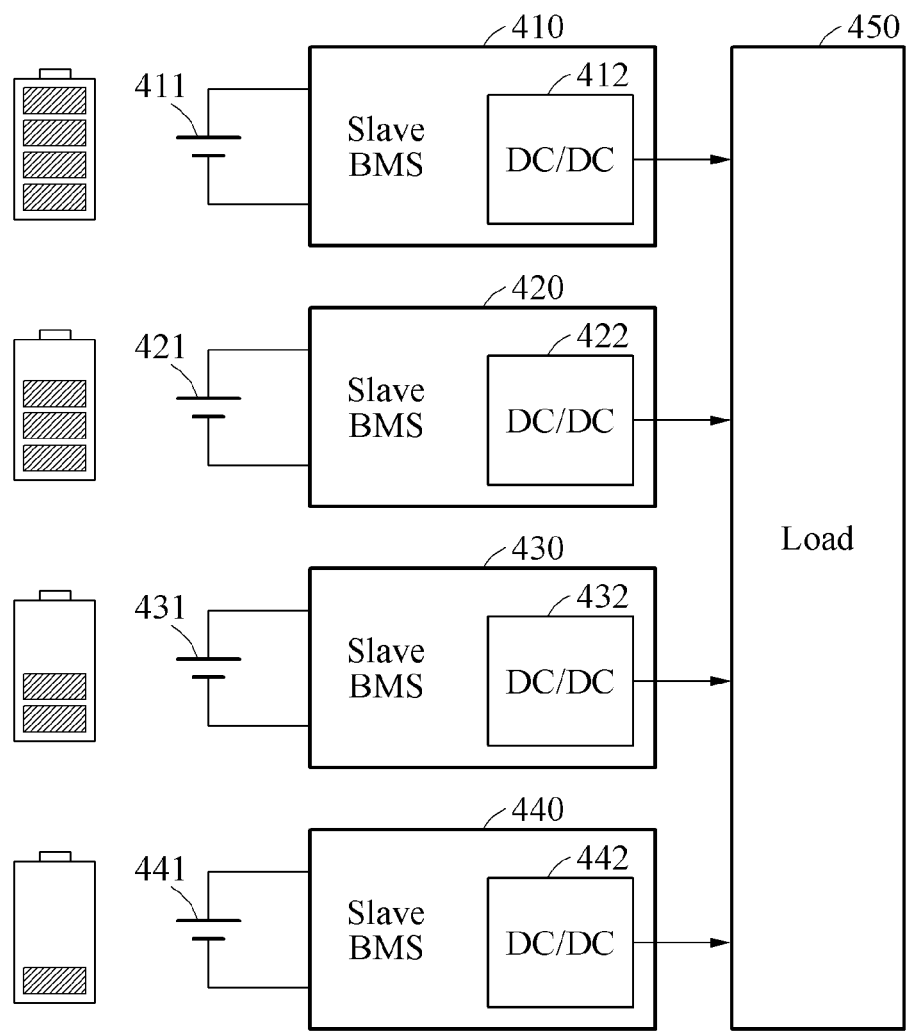
FIG. 4 illustrates an example of a plurality of slave battery management apparatuses.

FIG. 4 illustrates an example of a plurality of cooperative slave battery management apparatuses.

FIG. 4 illustrates a plurality of slave battery management apparatuses 410, 420, 430, and 440 and a respectively corresponding plurality of batteries 411, 421, 431, and 441. State information of each of the plurality of batteries 411, 421, 431, and 441 is also illustrated in FIG. 4. In an example of FIG. 4, state information of the battery 411 is the highest and state information of the battery 441 is the lowest.

In the example shown, the state information of the battery 441 is lower than those of the batteries 411, 421, and 431. Thus, when each of the plurality of batteries 411, 421, 431, and 441 supplies the same power to a load 450, the battery 441 and battery 431 may be over-discharged. In this example, a life degradation speed of a battery pack including the plurality of batteries 411, 421, 431, and 441 may increase and the battery pack may be used inefficiently.

Each of the plurality of slave battery management apparatuses 410, 420, 430, and 440 transmits state information of a corresponding battery to a master battery management apparatus. The master battery management apparatus receives state information_1, state information_2, state information_3, and state information_4, . . . state information n, corresponding to the plurality of batteries 411, 421, 431, and 441, respectively. Although four batteries are shown (for convenience, clarity, and conciseness) any suitable number of batteries may be used.

The master battery management apparatus determines control values corresponding to the state information_1, the state information_2, the state information_3, and the state information_4. For example, when the state information_2, the state information_3, and the state information_4 is 1, 0.75, 0.5, and 0.25, respectively, a ratio between a sum of state information and the state information_1 is 0.4 (=1/2.5) and a ratio between the sum of state information and the state information_2 is 0.3 (=0.75/2.5). Also, a ratio between the sum of state information and the state information_3 is 0.2 (=0.5/2.5) and a ratio between the sum of state information and the state information_4 is 0.1 (=0.25/2.5). In this example, when a required physical quantity of the load 450 is 90 watts (W), the master battery management apparatus determines the control value for controlling a DC/DC converter 412 based on 36 W (=90*0.4) which proportionately distributes the desired physical quantity of the load across the batteries according to the ratio of state information to cumulative state of the battery pack. The master battery management apparatus transmits the control value to the slave battery management apparatus 410, and a controller controls the DC/DC converter 412 such that the DC/DC converter 412 outputs a physical quantity of 36 W. Similarly, the master battery management apparatus determines control values for controlling DC/DC converters 422, 432, and 442, and transmits the control values to the slave battery management apparatuses 420, 430, and 440. The DC/DC converter 422 outputs a physical quantity of 27 W, the DC/DC converter 432 outputs a physical quantity of 18 W, and the DC/DC converter 442 outputs a physical quantity of 9 W for a combined total of 90 W.

A battery having high state information is adaptively controlled to supply a relatively large physical quantity to the load 450, and a battery having low state information is adaptively controlled to supply a relatively small physical quantity to the load 450. In other words, each of the plurality of slave battery management apparatuses 410, 420, 430, and 440 performs an individual load control. Accordingly, a life degradation of the battery pack may be alleviated, an available capacity of the battery pack may increase, and whether a malfunction is to occur may be more easily predicted.

Because the descriptions of FIGS. 1 through 3 are also applicable here, repeated descriptions with respect to FIG. 4 will be omitted for clarity and conciseness.

Figure 5:
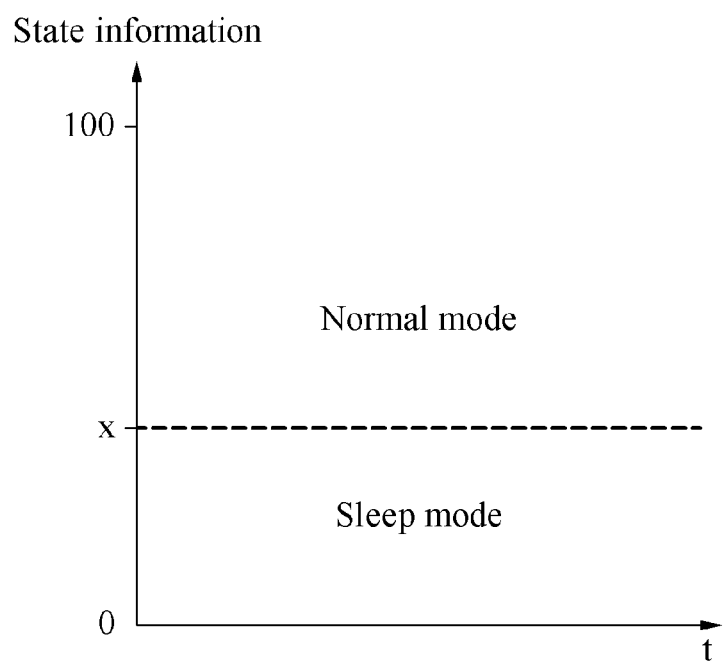
FIG. 5 illustrates an example of an operation mode of a slave battery management apparatus.

FIG. 5 illustrates an example of an operation mode of a slave battery management apparatus.

Referring to FIG. 5, an operation mode of a slave battery management apparatus includes at least a normal mode and a sleep mode. A master battery management apparatus determines whether the slave battery management apparatus is to be in the normal mode or the sleep mode. As illustrated in FIG. 5, when state information is less than or equal to a reference value, for example, a reference value x (due to e.g. a discharging of a battery), the master battery management apparatus changes the operation mode of the slave battery management apparatus to be the sleep mode. Also, the master battery management apparatus defines a first control signal and transmits the first control signal to the slave battery management apparatus. The slave battery management apparatus enters the sleep mode based on the first control signal.

When the battery is charged, state information of the battery changes. Through this, the state information of the battery may exceed a reference value. In this example, the master battery management apparatus defines a second control signal and transmits the second control signal to the slave battery management apparatus. The slave battery management apparatus enters the normal mode based on the second control signal.

Because the descriptions of FIGS. 1 through 4 are also applicable here, repeated descriptions with respect to FIG. 5 will be omitted.

Figure 6:
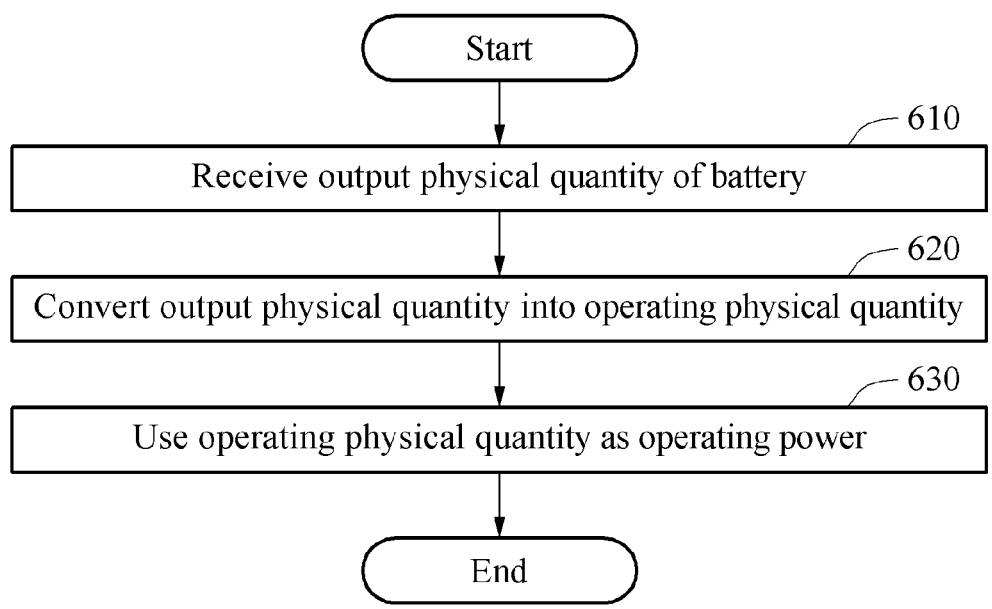
FIG. 6 illustrates an example of an operation method of a slave battery management apparatus.

FIG. 6 illustrates an example of an operation method of a slave battery management apparatus.

A power supply of a slave battery management apparatus is not an external power source but the sensing target battery.

Referring to FIG. 6, in operation 610, the slave battery management apparatus receives an output physical quantity of a battery. In this example, the battery is a battery sensed and/or controlled by the slave battery management apparatus.

In operation 620, the slave battery management apparatus converts the output physical quantity into an operating physical quantity corresponding to a required physical quantity of a controller.

In operation 630, the slave battery management apparatus uses the operating physical quantity as the operating power. Through this, the slave battery management apparatus receives a voltage, a current, and/or power from the sensing target battery and performs a plurality of operations. The plurality of operations includes, for example, a sensing operation, an operation of processing a sensed physical quantity, and/or a communicating operation.

Because the descriptions of FIGS. 1 through 5 are also applicable here, repeated descriptions with respect to FIG. 6 will be omitted.

Figure 7:
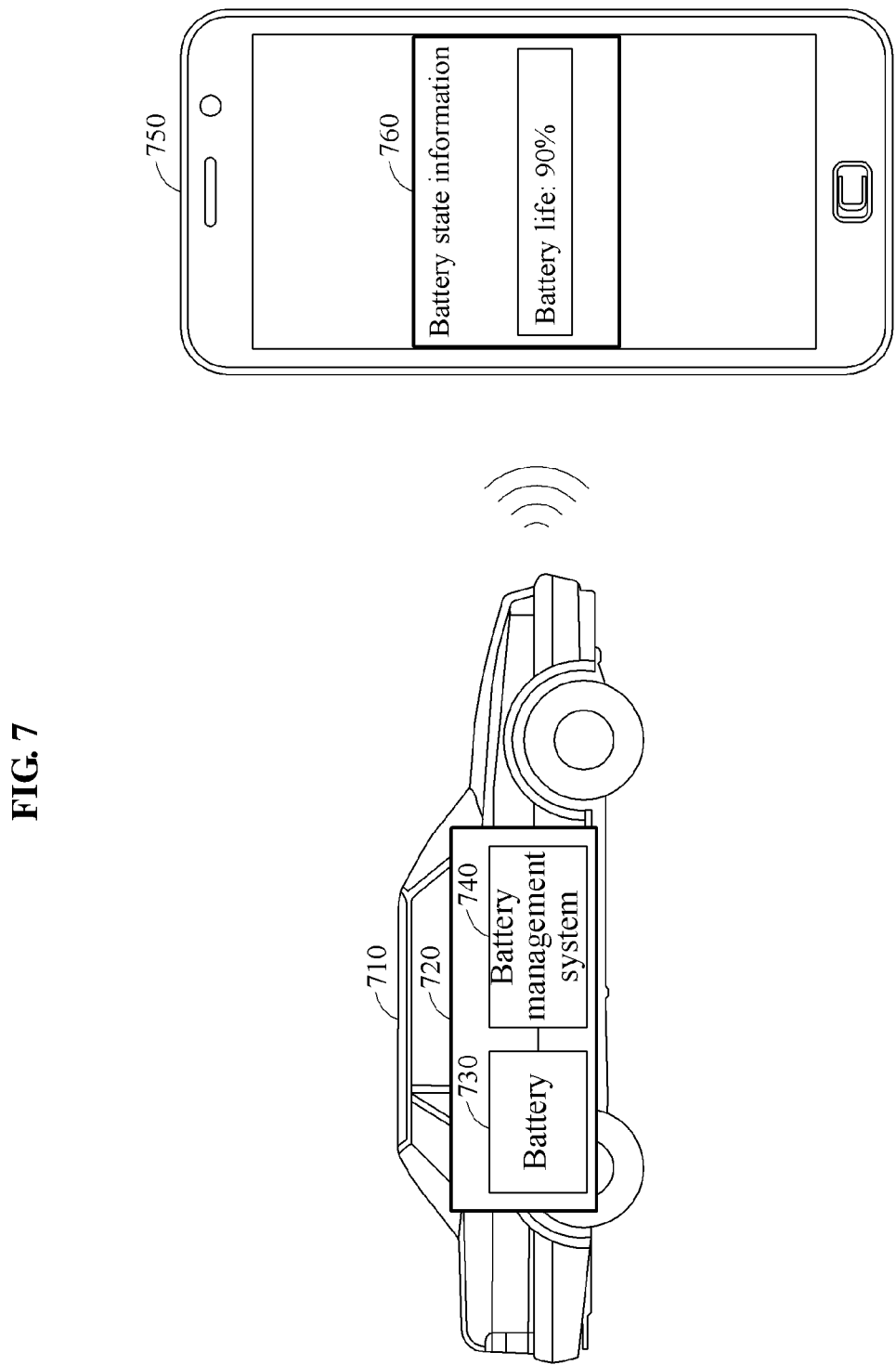
FIG. 7 illustrates an example of providing battery state information.

FIG. 7 illustrates an example of providing battery state information.

Referring to FIG. 7, a physical application such as an electric vehicle 710 includes a battery system 720. The aforementioned physical application is merely an example and thus, a type of physical application is not limited to the example.

The battery system 720 includes a battery 730 and a battery management system 740.

The battery 730 is, for example, a battery pack. The battery pack includes a plurality of battery modules or a plurality of battery cells.

The battery management system 740 includes a master battery management apparatus and a slave battery management apparatus as discussed in the foregoing explanation. As described with reference to FIG. 4, the slave battery management apparatus is electrically connected to a battery cell. For example, when four battery cells are provided, the slave battery management apparatuses is electrically connected to the respective battery cells. In other words, a slave battery management apparatus corresponding to each of the battery cells is included in the physical application.

As discussed above, the slave battery management apparatus receives a power from a corresponding battery cell in lieu of a power supply source, for example, a 12 V lead storage battery in an electric vehicle. The slave battery management apparatus performs a plurality of operations using the power supplied from the corresponding battery cell. The slave battery management apparatus senses a physical quantity of the corresponding battery cell and processes the sensed physical quantity. The sensed physical quantity may be an analog electric signal, for example, a voltage signal. The controller of the slave battery management apparatus includes an analog-to-digital (ADC) converter. The ADC converter converts the electric signal into battery data corresponding to digital data. Also, the slave battery management apparatus transmits the battery data to the master battery management apparatus.

For example, the master battery management apparatus receives physical quantity data from each of the plurality of slave battery management apparatuses. In this example, the master battery management apparatus determines cell state information of each of the plurality of battery cells. The cell state information include either one or both of an SOC and/or an SOH. The master battery management apparatus determines pack state information of each of the battery packs based on the state information of the plurality of battery cells in each pack. Also, the master battery management apparatus receives the cell state information from each of the plurality of slave battery management apparatuses. The master battery management apparatus determines the pack state information of the battery pack based on a plurality of items of cell state information.

The battery management system 740 transmits the pack state information and/or the cell state information to a terminal 750 through a communication interface. The terminal 750 displays the pack state information and/or the cell state information on, e.g., a window 760 of a display.

Because the descriptions of FIGS. 1 through 6 are also applicable here, repeated descriptions with respect to FIG. 7 will be omitted for clarity and conciseness.

Figure 8:
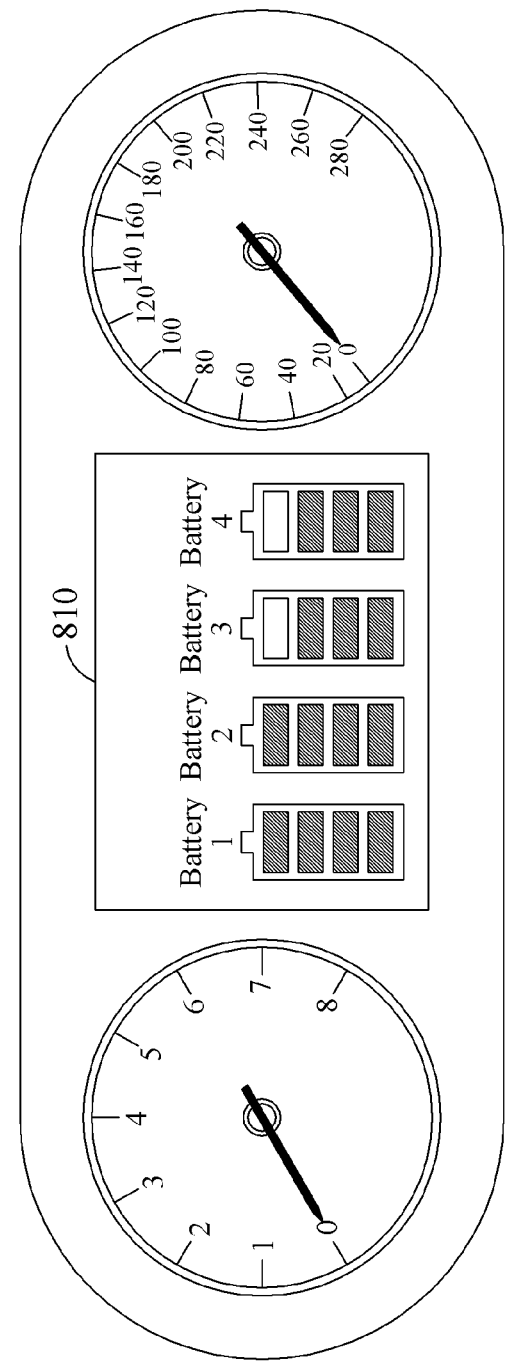
FIG. 8 illustrates another example of providing battery state information.

FIG. 8 illustrates an example of providing battery state information.

Referring to FIG. 8, state information 810 of each of a plurality of battery cells is output to a dashboard. As discussed above, a slave battery management apparatus determines a cell state information of a corresponding battery cell and transmits the cell state information to a master battery management apparatus.

The master battery management apparatus receives cell state information of a plurality of battery cells from a plurality of slave battery management apparatuses. The master battery management apparatus transmits the cell state information of the plurality of battery cells to a controller such as an electronic control unit (ECU) and the ECU outputs the cell state information to the dashboard. According to one or more embodiments, the master battery management apparatus may omit the ECU and transmit the cell state information directly to the dashboard.

Because the descriptions of FIGS. 1 through 7 are also applicable here, repeated descriptions with respect to FIG. 8 will be omitted.

The sensor 112, controller 113, filter 210, Insulator 220, converter 230, smoother 240, constant voltage maintainer 250, slave battery management system 410-440 in FIGS. 1-4 and 7 that perform the operations described in this application are implemented by hardware components configured to perform the operations described in this application that are performed by the hardware components. Examples of hardware components that may be used to perform the operations described in this application, where appropriate, include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 2 and 5-6 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

What is claimed is:

1. A slave battery management apparatus, comprising:
    a sensor configured to sense a parameter of a battery;
    a voltage converter configured to filter output voltage of the battery, convert the filtered output voltage into a first voltage, smooth the first voltage, and output a signal by adjusting a magnitude of the smoothed first voltage; and
    a controller configured to transmit battery data by using the outputted signal as an operating power,
    wherein the battery data is generated based on the sensed parameter.

2. The slave battery management apparatus of claim 1, wherein the voltage converter comprises:
    a filter configured to filter the output voltage of the battery,
    a first converter configured to convert the filtered output voltage into the first voltage,
    a smoother configured to remove a ripple component from the first voltage to smooth the first voltage, and
    a second converter configured to adjust a magnitude of a ripple-free DC voltage obtained by removing the ripple component from the DC voltage, the ripple-free DC voltage corresponding to the smoothed first voltage.

3. The slave battery management apparatus of claim 2, wherein the second converter is further configured to step up the ripple-free DC voltage in response to an operating voltage of the controller being greater than or equal to an output voltage of the battery, and to step down the ripple-free DC voltage in response to the operating voltage being less than the output voltage.

4. The slave battery management apparatus of claim 2, wherein the voltage converter further comprises:
    an insulator configured to electrically insulate the battery from the controller.

5. The slave battery management apparatus of claim 1, wherein
    the battery data comprises first parameter data corresponding to the parameter,
    the controller is further configured to transmit the first parameter data to a master battery management apparatus, to receive a first control signal defined based on a result of a comparison between first state information of the battery and a reference value from the master battery management apparatus, and to enter a sleep mode based on the first control signal, and
    the first state information is determined based on the first parameter data.

6. The slave battery management apparatus of claim 5, wherein the voltage converter is further configured to perform a sensing operation and a voltage conversion operation while being prevented from performing other operations while the slave battery management apparatus is in the sleep mode.

7. The slave battery management apparatus of claim 5, wherein
    in response to the battery being charged, the battery data comprises second parameter data corresponding to the parameter, and
    the controller is further configured to transmit the second parameter data to the master battery management apparatus, to receive a second control signal from the master battery management apparatus in response to second state information being greater than the reference value, and to shift an operation mode from the sleep mode to a normal mode based on the second control signal, and the second state information is determined based on the second parameter data.

8. The slave battery management apparatus of claim 5, wherein the reference value is determined based on an operating time during which the slave battery management apparatus operates using a remaining amount of charge in the battery.

9. The slave battery management apparatus of claim 1, further comprising:
a DC-to-DC (DC/DC) converter configured to convert an output voltage of the battery into a voltage to be output to a load,
wherein the battery data comprises state information determined based on the sensed parameter, and
wherein the controller is further configured to control the DC/DC converter using a control value corresponding to the state information.

10. The slave battery management apparatus of claim 1, wherein the output signal is the only power source of the controller.

11. A battery management system comprising:
a master battery management apparatus; and
at least one slave battery management apparatus configured to communicate with the master battery management apparatus,
the slave battery management apparatus comprises:
a controller;
a sensor configured to sense a parameter of a battery; and,
a voltage converter configured to filter output voltage of the battery, convert the filtered output voltage into a first voltage, smooth the first voltage, and output a signal by adjusting a magnitude of the smoothed first voltage,
wherein the controller is configured to transmit battery data to the master battery management apparatus by using the outputted signal as an operating power, the battery data being generated based on the sensed parameter.

12. The battery management system of claim 11, wherein the voltage converter comprises:
a filter configured to filter the output voltage of the battery;
a first converter configured to convert the filtered output voltage into the first voltage;
a smoother configured to remove a ripple component from the first voltage to smooth the first voltage; and
a second converter configured to adjust a magnitude of a ripple-free DC voltage obtained by removing the ripple component from the DC voltage, the ripple-free DC voltage corresponding to the smoothed first voltage.

13. The battery management system of claim 12, wherein the second converter is further configured to step up the ripple-free DC voltage in response to an operating voltage of the controller being greater than or equal to an output voltage of the battery, and step down the ripple-free DC voltage in response to the required voltage being less than the output voltage.

14. The battery management system of claim 11, wherein the battery data comprises first parameter data corresponding to the parameter,
the controller is further configured to transmit the first parameter data to the master battery management apparatus, to receive a first control signal from the master battery management apparatus, and to enter a sleep mode based on the first control signal, and
the master battery management apparatus is configured to determine first state information of the battery based on the first parameter data, to define the first control signal based on a result of comparison between the first state information of the battery and a reference value, and to transmit the first control signal to the controller.

15. The battery management system of claim 14, wherein in response to the battery being charged, the battery data comprises second parameter data corresponding to the parameter,
the controller is further configured to transmit the second parameter data to the master battery management apparatus, to receive a second control signal from the master battery management apparatus, and to shift an operation mode from the sleep mode to a normal mode based on the second control signal, and
the master battery management apparatus is further configured to determine second state information based on the second parameter data, to define the second control signal in response the second state information being greater than the reference value, and to transmit the second control signal to the controller.

16. The battery management system of claim 14, wherein the reference value is determined based on an operating time during which the slave battery management apparatus operates using a remaining amount of charge in the battery.

17. The battery management system of claim 11, wherein the slave battery management apparatus further comprises a DC-to-DC (DC/DC) converter configured to convert an output voltage of the battery into a voltage to be output to a load,
the battery data comprises state information determined based on the sensed parameter, and
the controller is further configured to control the DC/DC converter using a control value corresponding to the state information.

18. The battery management system of claim 17, wherein the controller is further configured to transmit the state information to the master battery management apparatus, and
the master battery management apparatus is configured to determine the control value that corresponds to the state information, based on a sensed value of the load, and to transmit the control value to the controller.

19. An operation method of a slave battery management apparatus, the method comprising:
sensing a parameter of a battery;
filtering output voltage of the battery;
converting the filtered output voltage into a first voltage;
smoothing the first voltage;
outputting a signal by adjusting a magnitude of the smoothed first voltage; and
transmitting battery data by using the outputted signal as an operating power, wherein the battery data is generated based on sensed parameter.

20. The operation method of claim 19, wherein
the smoothing of the first voltage comprises removing a ripple component from the first voltage, and
the outputting of the operating power comprises adjusting a magnitude of a ripple-free DC voltage obtained by removing the ripple component from the DC voltage, the ripple-free DC voltage corresponding to the smoothed first voltage.

* * * * *